US012618713B2

(12) United States Patent
Chien et al.

(10) Patent No.: US 12,618,713 B2
(45) Date of Patent: May 5, 2026

(54) WIDE-FIELD SPECTRAL IMAGING SYSTEM

(71) Applicant: National Central University, Taoyuan City (TW)

(72) Inventors: Fan-Ching Chien, Taoyuan City (TW); Kun-Yu Lai, Taoyuan City (TW); Ching-Lung Luo, Taoyuan City (TW)

(73) Assignee: National Central University, Taoyuan City (TW)

( * ) Notice: Subject to any disclaimer, the term of this patent is extended or adjusted under 35 U.S.C. 154(b) by 168 days.

(21) Appl. No.: 18/393,636

(22) Filed: Dec. 21, 2023

(65) Prior Publication Data

US 2024/0230406 A1 Jul. 11, 2024

(30) Foreign Application Priority Data

Dec. 22, 2022 (TW) .................................. 111149483

(51) Int. Cl.
*G01J 3/28* (2006.01)
*G01J 3/02* (2006.01)
(Continued)

(52) U.S. Cl.
CPC .......... *G01J 3/2823* (2013.01); *G01J 3/0208* (2013.01); *G01J 3/021* (2013.01); *G01J 3/027* (2013.01);
(Continued)

(58) Field of Classification Search
CPC .......... G01J 2003/064; G01J 2003/069; G01J 2003/1213; G01J 2003/2826;
(Continued)

(56) References Cited

U.S. PATENT DOCUMENTS 7,652,765 B1 * 1/2010 Geshwind ............. G01J 3/2823
356/330
2005/0123979 A1 6/2005 Weiss
(Continued)

FOREIGN PATENT DOCUMENTS

WO WO-2019232875 A1 * 12/2019 ........... A61B 5/0073

OTHER PUBLICATIONS

Cheng Zheng, Jong Kang Park, Murat Yildirim, Josiah R. Boivin, Yi Xue, Mriganka Sur, Peter T. C. So, and Dushan N. Wadduwage. De-scattering with Excitation Patterning enables rapid wide-field imaging through scattering media. Science Advances. vol. 7, No. 28. American Association for the Advancement of Science. Jul. 7, 2021. eaay5496, pp. 1-8.
(Continued)

*Primary Examiner* — Hina F Ayub
(74) *Attorney, Agent, or Firm* — Winston Hsu

(57) ABSTRACT

The present invention provides a wide-filed spectral imaging system including a laser generator, a wavelength adjustment module, an objective lens, and a single-pixel imaging and a spectral separating module. The laser generator is configured to generate a laser excitation beam. The wavelength adjustment module is configured to disperse the laser excitation beam into a plurality of beams of different wavelengths. The objective lens is configured to focus the plurality of beams of different wavelengths on a sample to excite molecules under test in the sample and generate an emission light. The single-pixel imaging and spectral separating module is configured to generate a series of patterns and modulate the emission light with the series of patterns to generate a diffracted beam. The single-pixel imaging and spectral separating module further disperses the wavelength of the diffracted beam, collects light signals of the expanded
(Continued)

diffracted beam, and performs a spectral image reconstruction.

8 Claims, 9 Drawing Sheets

(51) Int. Cl.

| | |
|---|---|
| *G01J 3/06* | (2006.01) |
| *G01J 3/10* | (2006.01) |
| *G01J 3/12* | (2006.01) |
| *G01J 3/18* | (2006.01) |

(52) U.S. Cl.
CPC . *G01J 3/06* (2013.01); *G01J 3/10* (2013.01); *G01J 3/18* (2013.01); *G01J 2003/064* (2013.01); *G01J 2003/069* (2013.01); *G01J 2003/1213* (2013.01); *G01J 2003/2826* (2013.01)

(58) Field of Classification Search
CPC ........ G01J 3/0208; G01J 3/021; G01J 3/0229; G01J 3/027; G01J 3/06; G01J 3/10; G01J 3/18; G01J 3/2823
See application file for complete search history.

(56) References Cited

U.S. PATENT DOCUMENTS

| | | | | |
|---|---|---|---|---|
| 2008/0117421 | A1* | 5/2008 | Yamaguchi | G01J 3/021 |
| | | | | 356/417 |
| 2021/0330184 | A1* | 10/2021 | Frisken | G01J 3/4406 |
| 2021/0404964 | A1 | 12/2021 | Schwedt | |
| 2022/0317046 | A1* | 10/2022 | Kersey | A61B 5/14539 |
| 2024/0045193 | A1* | 2/2024 | Wang | G02B 21/0076 |

OTHER PUBLICATIONS

Chia-Yuan Chang, Cheng-Han Lin, Chun-Yu Lin, Yong-Da Sie, Yvonne Yuling Hu, Sheng-Feng Tsai, and Shean-Jen Chen, "Temporal focusing-based widefield multiphoton microscopy with spatially modulated illumination for biotissue imaging," Journal of Biophotonics vol. 11, No. 1, e201600287, 2017 WILEY-VCH Verlag Gmbh & Co. KGaA, Weinheim, pp. 1-10, May 2, 2017.
Fan-Ching Chien, Super-Resolution Imaging Informatics for Molecule Functions Analysis in Thick Biological Specimens (third year), Government Research Bulletin, Mar. 30, 2020. https://www.grb.gov.tw/search/planDetail?id=11874786.

* cited by examiner

WIDE-FIELD SPECTRAL IMAGING SYSTEM

CROSS REFERENCE TO RELATED APPLICATION

This application claims the benefit of Taiwan patent application No. 111149483, filed on Dec. 22, 2022. The content of the application is incorporated herein by reference.

BACKGROUND OF THE INVENTION

1. Field of the Invention

The present invention pertains to a wide-field spectral imaging system.

2. Description of the Prior Art

The statements herein merely provide background information related to the present disclosure and do not necessarily constitute prior art.

Since fluorescence microscopy based on multiphoton excitation (MPE) has several advantages, such as good optical section imaging capability, excellent biological sample penetration, fluorescent targeting, and low photobleaching, MPE has become the main technique for biological samples imaging. The conventional MPE-based fluorescence microscope uses a method of spatial focusing and laser scanning to produce fluorescent images of biological samples. However, due to the many dynamic events in living biological samples needed to be studied by imaging, various fast-scanning techniques, such as using a resonant scanner, an acousto-optic deflector and diffractive spatial light modulator, multifocal scanning, line-scanning temporal focusing, and a wide-field temporal-focusing multiphoton excitation microscopy (TEMPEM) are used to improve the temporal resolution of the MPE fluorescence imaging.

It was found that the conventional MPE-based fluorescence microscope with a single excitation wavelength can excite the fluorescence of two different fluorophores with overlapping two-photon absorption spectra. However, the options of fluorophores for biomedical applications are limited by the aforementioned requirement when further investigating the selection of excitation wavelengths for the multi-color biological sample imaging. In view of the foregoing, some scholars may adjust the incident wavelength of the pulsed laser to match the wavelength of the multiphoton maximum absorption in different fluorophores. However, this method still has the disadvantage that it is difficult for the MPE fluorescence microscope based on temporal focusing to timely adjust the excitation wavelength, so the imaging quality is still not good enough.

SUMMARY OF THE INVENTION

In recent years, designing the optical components along the optical path results in making a breakthrough in adjusting the excitation wavelength, thereby improving the imaging quality of the MPE-based fluorescence microscope. However, there is still a need for further improvement of spectral analysis, imaging quality, operation convenience, and measurement efficiency of the biological samples labeled with multicolor fluorophores.

Accordingly, some embodiments of the present disclosure provide a wide-field spectral imaging system, comprising a laser generator, a wavelength adjustment module, a collimating lens, an objective lens, a dichroic mirror, a digital micromirror device, a first focal lens, a pinhole, and a prism. The laser generator is configured to generate a laser excitation beam. The wavelength adjustment module is configured to spatially disperse a plurality of beams of different wavelengths within the laser excitation beam. The collimating lens is configured to adjust the plurality of beams of different wavelengths to be parallel to each other. The objective lens is configured to focus the plurality of beams of different wavelengths passing through the collimating lens on a sample to excite molecules under test in the sample and to generate an emission light. The dichroic mirror is configured to reflect a portion of the emission light having a preselected wavelength range to form a sample beam. The digital micromirror device is configured to modulate a series of patterns on the sample beam and to generate a diffracted beam. The first focal lens is configured to focus and reduce a diameter of the diffracted beam. The pinhole is configured to filter the diffracted beam making the diffracted beam appear as a point light source. The prism is configured to perform wavelength dispersing on the diffracted beam passing through the pinhole, providing the light signal collection for a spectral image reconstruction.

In some embodiments of the present disclosure, the wavelength adjustment module comprises a scanning mirror and a diffraction element. The scanning mirror is configured to fine-tune an output direction of the laser excitation beam passing through the scanning mirror. The diffraction element is configured to spatially disperse the plurality of beams of different wavelengths within the laser excitation beam passing through the scanning mirror.

In some embodiments of the present disclosure, the wavelength adjustment module further comprises an expander, configured to enlarge a cross-sectional area of the laser excitation beam. The expander comprises a first lens and a second lens, and the laser excitation beam passes through the scanning mirror, the first lens, the second lens, and the diffraction element in sequence.

In some embodiments of the present disclosure, the wide-field spectral imaging system further comprises a filter, disposed between the dichroic mirror and the digital micromirror device, for filtering out a wavelength signal of the laser excitation beam in the sample beam reflected by the dichroic mirror.

In some embodiments of the present disclosure, the wide-field spectral imaging system further comprises a second focal lens and a detection element. The second focal lens is configured to focus the diffracted beam passing through the prism. The detection element is configured to collect the diffracted beam focused by passing through the second focal lens, for the spectral image reconstruction of different wavelength bands.

In some embodiments of the present disclosure, the wide-field spectral imaging system further comprises a light intensity adjustment element, disposed between the laser generator and the wavelength adjustment module, for controlling the power of the laser excitation beam after passing the light intensity adjustment element.

The position of the optical components described in the present disclosure, such as "between", mainly refers to the relative position along the optical path, and is not necessarily limited to the relative position in space.

Some embodiments of the present disclosure provide a wide-field spectral imaging system, comprising a laser generator, a wavelength adjustment module, an objective lens, and a single-pixel imaging and spectral separating module. The laser generator is configured to generate a laser excitation beam. The wavelength adjustment module is configured to disperse the laser excitation beam into a plurality of beams of different wavelengths. The objective lens is configured to focus the plurality of beams of different wavelengths on a sample to excite molecules under test in the sample and generate an emission light. The single-pixel imaging and spectral separating module is configured to generate a series of patterns and modulate the emission light with the series of patterns to generate a diffracted beam. The single-pixel imaging and spectral separating module further disperses the wavelength of the diffracted beam, collects light signals of the diffracted beam, and performs a spectral image reconstruction.

In some embodiments of the present disclosure, the wide-field spectral imaging system further comprises a filter, disposed between the objective lens and the single-pixel imaging and spectral separating module, for filtering out a wavelength signal of the laser excitation beam in the emission light.

Some embodiments of the present disclosure provide a wide-field spectral imaging system, comprising a laser generator, a micromirror wavelength adjustment and single-pixel imaging module, a collimating lens, an objective lens, a dichroic mirror, a first focal lens, and a prism. The laser generator is configured to generate a laser excitation beam. The micromirror wavelength adjustment and single-pixel imaging module is configured to generate a series of patterns and modulate the laser excitation beam with the series of patterns to generate multiple sets of diffracted beams. Each set of diffracted beams corresponds to a wavelength. The collimating lens is configured to adjust the sets of diffracted beams to be parallel to each other. The objective lens is configured to focus the sets of diffracted beams passing through the collimating lens on a sample, and to excite the molecules under test in the sample and generate an emission light. The dichroic mirror is configured to reflect a portion of the emission light having a preselected wavelength range to form a sample beam. The first focal lens is configured to focus and reduce the diameter of the sample beam. The prism is configured to perform wavelength dispersing on the sample beam passing through the first focal lens, for subsequent light signal collection and spectral image reconstruction.

In some embodiments of the present disclosure, the micromirror wavelength adjustment and single-pixel imaging module comprises a scanning mirror and a digital micromirror device. The scanning mirror is configured to fine-tune an output direction of the laser excitation beam after the laser excitation beam passes through the scanning mirror. The digital micromirror device is configured to generate the series of patterns, and modulate the laser excitation beam with the series of patterns to generate the sets of diffracted beams, for spatially separating different wavelength portions of the laser excitation beam passing through the scanning mirror.

In some embodiments of the present disclosure, the wavelength adjustment and single-pixel imaging module further comprises an expander for enlarging the cross-sectional area of the laser excitation beam, wherein the expander comprises a first lens and a second lens, and the laser excitation beam passes through the scanning mirror, the first lens, the second lens, and the digital micromirror device in sequence.

In some embodiments of the present disclosure, the wide-field spectral imaging system further comprises a filter for filtering out the wavelength signal of the laser excitation beam in the sample beam reflected by the dichroic mirror.

In some embodiments of the present disclosure, the wide-field spectral imaging system further comprises a second focal lens and a detection element. The second focal lens is configured to focus the diffracted beams that have been dispersed by the prism. The detection element is configured to collect the focused diffracted beam passing through the second focal lens, for subsequent spectral image reconstruction of different wavelength bands.

In some embodiments of the present disclosure, the wide-field spectral imaging system further comprises a light intensity adjustment element, disposed between the laser generator and the micromirror wavelength adjustment and single-pixel imaging module, for controlling the power of the laser excitation beam in the subsequent optical path.

Some embodiments of the present disclosure provide a wide-field spectral imaging system, comprising a laser generator, a micromirror wavelength adjustment and single-pixel imaging module, an objective lens, and a spectral separating module. The laser generator is configured to generate a laser excitation beam. The micromirror wavelength adjustment and single-pixel imaging module is configured to disperse the laser excitation beam into multiple beams of different wavelengths, generate a series of patterns, and modulate the laser excitation beam with the series of patterns to generate multiple sets of diffracted beams. Each set of diffracted beams corresponding to a wavelength. The objective lens is configured to focus the sets of diffracted beams on a sample to excite the molecules under test in the sample and to generate an emission light. The spectral separating module is configured to collect the emission light for performing spectral image reconstruction.

In some embodiments of the present disclosure, the wide-field spectral imaging system further comprises a filter, disposed between the objective lens and the spectral separating module, for filtering out the wavelength signal of the laser excitation beam in the emission light.

The embodiments of the present disclosure can achieve high-quality and efficient spectrum image analysis with the combination of the wavelength adjustment module and the single-pixel imaging and spectral separating module, or the combination of the micromirror wavelength adjustment and single-pixel imaging module and the spectral separating module. In addition, a short-pass filter that can pass wider wavelength bands can be used in the optical paths of the two aforementioned combinations, for improving the cumbersome operation of using a filter wheel with multiple narrow bandpass filters and making the image quality better.

In order to make the above-mentioned features and advantages of the present disclosure more understandable, the subsequent embodiments are exemplified and described in detail in conjunction with the accompanying drawings.

These and other objectives of the present invention will no doubt become obvious to those of ordinary skill in the art after reading the following detailed description of the preferred embodiment that is illustrated in the various figures and drawings.

DETAILED DESCRIPTION

In order to make the present disclosure more detailed and complete, the following contents provide illustrative descriptions of the embodiments and certain embodiments of the present disclosure; however, this is not the only form of implementation or application of the certain embodiments of the present disclosure. The various embodiments disclosed below can be combined or replaced with each other, or can be added to other embodiments in one embodiment without further description or explanation.

In the following descriptions, various specific details will be described in detail to enable the reader to fully understand the following embodiments. However, the embodiments of the present disclosure can be practiced without these specific details. In other cases, for simplicity of the drawings, some well-known structures and devices are illustrated schematically.

Figure 1:
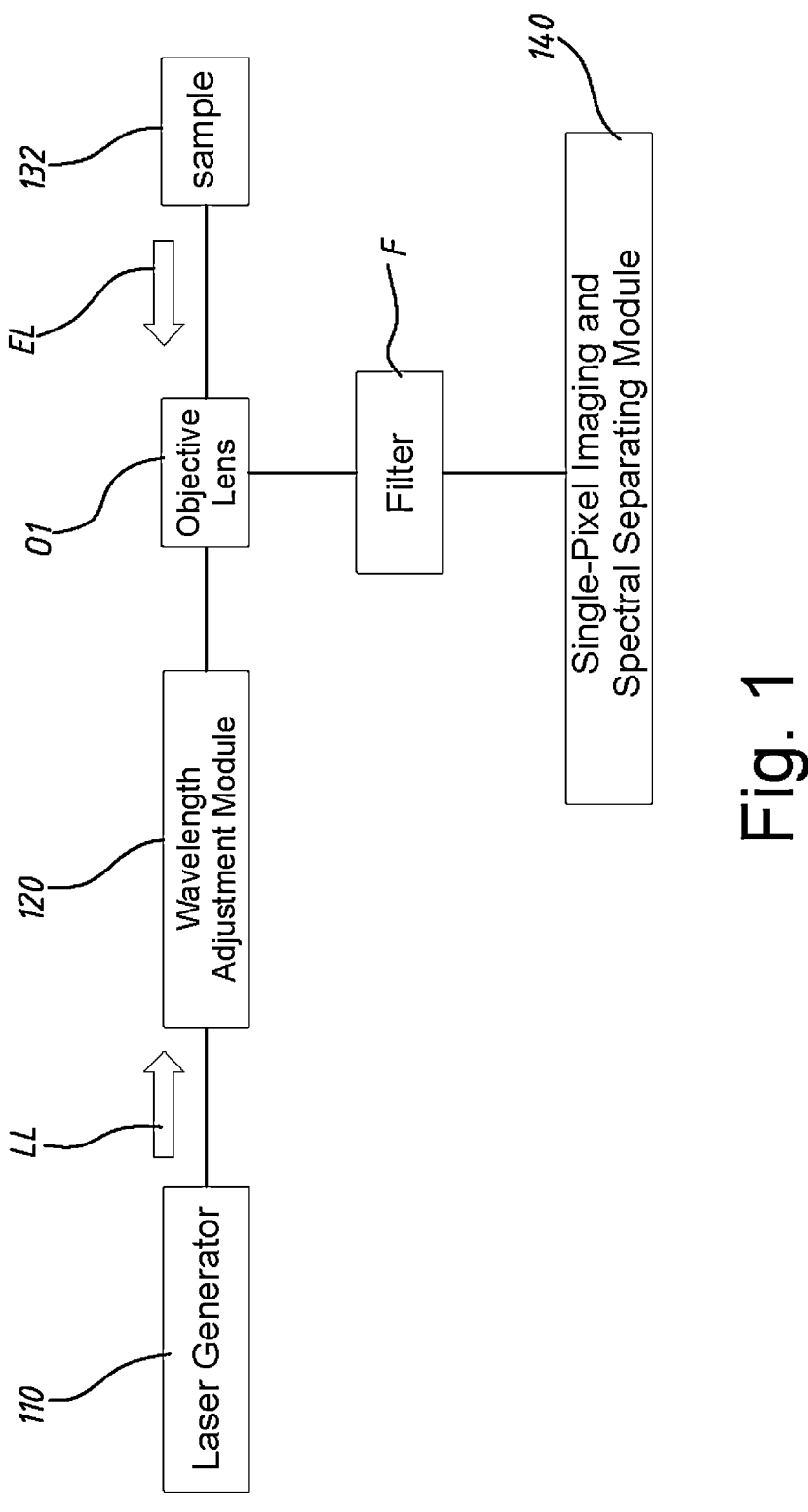
FIG. 1 is a block diagram illustrating a wide-field spectral imaging system according to some embodiments of the present disclosure.

FIG. 1 illustrates a block diagram of optical components of a wide-field spectral imaging system 100 according to some embodiments of the present disclosure. The wavelength adjustment module 120 can adjust the diameter and the incident angle, to the following components, of the laser excitation beam LL generated by the laser generator 110 according to the wavelength of the laser excitation beam LL. These beams are then focused by an objective lens O1 on a sample 132 to excite the molecules under test in the sample 132 and generate an emission light EL. The molecules under test in the sample 132 are different types of fluorescent molecules that are pre-stained in the sample 132 or molecules that can generate Raman spectral signals. The wavelength adjustment module 120 can adjust the subsequent propagation direction of the beams with different wavelengths according to the wavelength of the laser excitation beam LL, achieving the optimal excitation of different types of molecules under test in the same sample 132. The aforementioned different types of molecules under test can be fluorescent molecules that require different excitation wavelengths to generate their emission lights. That is, a single wavelength of light cannot fully satisfy the optimal absorption wavelength of each type of molecule under test in the sample 132. Since the imaging of different parts or features of the sample 132 have different types of corresponding molecules under test, the wavelength adjustment module 120 of the wide-field spectral imaging system 100 can obtain optimal excitation signals from different types of molecules under test in the sample 132 and perform subsequent image reconstruction efficiently and accurately.

The emission light EL propagates along the original optical path through the objective lens O1, and enters a single-pixel imaging and spectral separating module 140 after filtering out the wavelength signal of the original laser excitation beam LL in the emission light EL by a filter F. The single-pixel imaging and spectral separating module 140 is used to generate a series of patterns FG (referring to FIG. 2), modulate the filtered emission light EL with the series of patterns FG, and generate a modulated beam. The single-pixel imaging and spectral separating module 140 further performs wavelength dispersing on the modulated beam. After the wavelength dispersion, the light signals are collected to perform a spectral image reconstruction. The wavelength signals of the filtered emission light EL and the optical components of the single-pixel imaging and spectral separating module 140, as well as detailed steps of optical imaging will be exemplified and described in detail in the following embodiments illustrated in FIG. 2.

Figure 2:
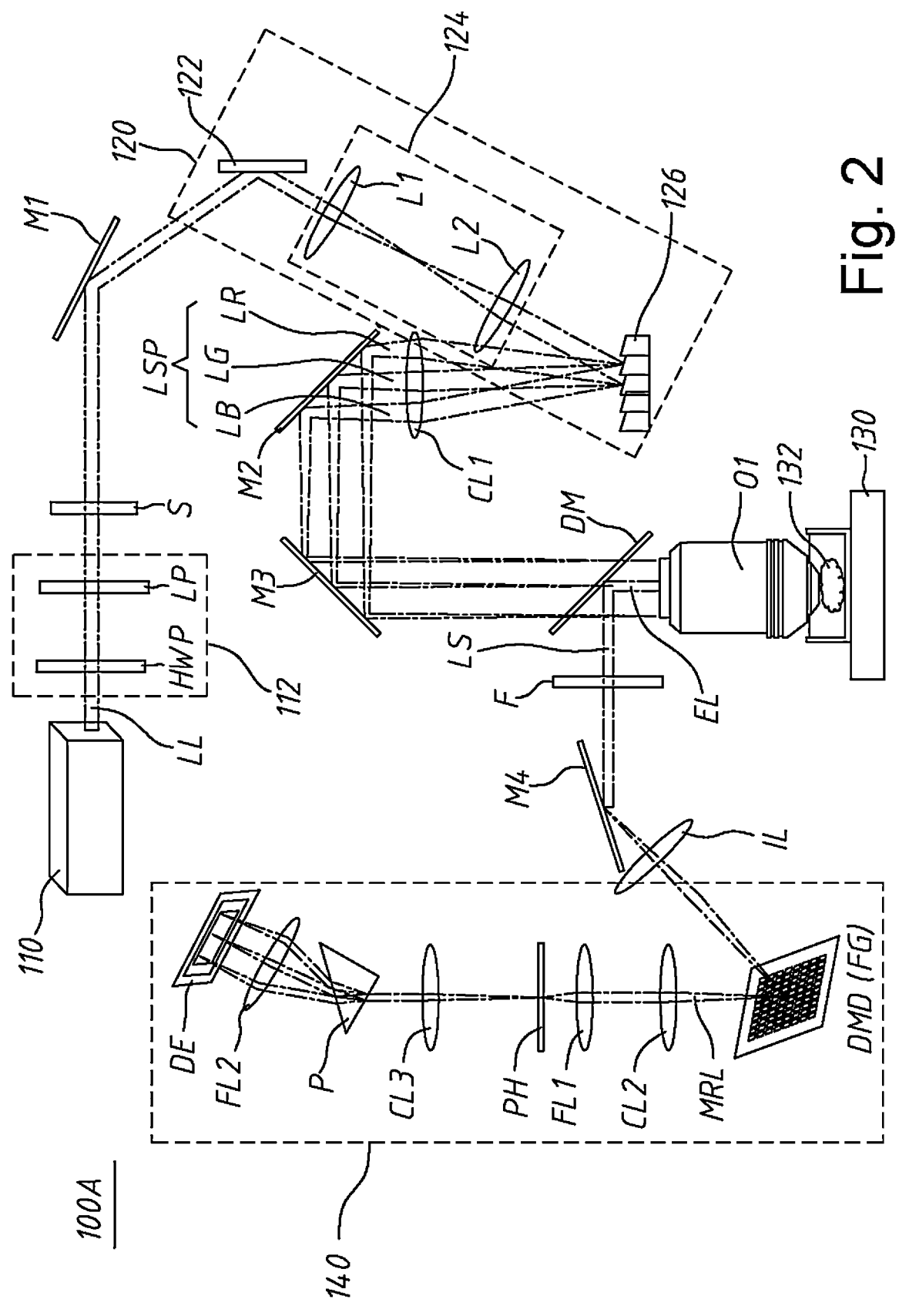
FIG. 2 is a schematic diagram illustrating an optical path of a wide-field spectral imaging system according to some embodiments of the present disclosure.

FIG. 2 illustrates a schematic diagram of the optical path of the wide-field spectral imaging system 100A according to some embodiments of the present disclosure. In practice, operations such as a beam expansion and optical path guidance can be performed on the beams to meet space limitations of the practical measuring and the configuration of the imaging system. The embodiment of FIG. 2 is an example of a configuration of the optical components for imaging and a corresponding optical path diagram. In some embodiments of the present disclosure, the laser generator 110 may be a Ti: Sapphire ultrafast laser generator for generating the laser excitation beam LL. The wavelength of the laser excitation beam LL can range from 680 nm and 1080 nm, the diameter of the laser excitation beam LL is about 1.2 mm, and the repetition rate of the laser excitation beam LL is 80 MHz. In this example of the present disclosure, when the wavelength of the laser excitation beam LL is 800 nm, the pulse width of the laser excitation beam LL is 140 fs.

The laser excitation beam LL generated by the laser generator 110 can sequentially pass through a light intensity adjustment element 112 and a shutter S. The light intensity adjustment element 112 can be used to control the power of the laser excitation beam LL in the subsequent optical path. For example, the light intensity adjustment element 112 can be a combination of a half-wave plate HWP and a linear polarizer LP, but the present disclosure is not limited thereto. The shutter S can be used as a switch for controlling the laser excitation beam LL to reach the subsequent optical components in the optical path of the embodiment of the present disclosure. Next, a reflector M1 can be added as needed to adjust the direction of the optical path, allowing the laser excitation beam LL to enter the wavelength adjustment module 120 after passing through the reflector M1. The wavelength adjustment module 120 is used to adjust the subsequent propagation direction of laser excitation beam LL according to its wavelength, which is convenient for these beams to pass through the subsequent optical components. This approach is more convenient and time-saving than the prior art, when it comes to the laser generator 110 switching and generating different wavelength beams along the same space of the optical path.

Specifically, the wavelength adjustment module 120 at least comprises a scanning mirror 122, an expander 124, and a diffraction element 126. The scanning mirror 122 can be rotated by a motor, for fine-tuning the output direction of the laser excitation beam LL after passing through the scanning mirror 122. Therefore, the position of the laser excitation beam LL entering the expander 124 can be adjusted to select direction of the diffraction light after the laser excitation beam LL passes the diffraction element 126. It can be convenient for the laser generator 110 to switch the beams of different wavelengths on the same system 100A. In other words, by rotating and adjusting the scanning mirror 122, target wavelengths to be selected in the laser excitation beam LL can be adjusted to propagate in the same direction after leaving the diffraction element 126. In some embodiments of the present disclosure, a slide rail combined with a drive motor for driving the slide rail can also be used with the aforementioned scanning mirror 122. The aforementioned slide rail is used for linear movement other than rotation. For the use of slide rails, please refer to FIG. 4 and FIG. 5 of Taiwan Patent No. 1655455B for descriptions and illustrations of displacement elements, which are not repeated here.

The expander 124 can be composed of a first lens L1 and a second lens L2, for enlarging a cross-sectional area of the laser excitation beam LL perpendicular to its own propagation direction. According to the actual needs, the first lens L1 and the second lens L2 can both be convex lenses, or a combination of a concave lens and a convex lens. In some embodiments of the present disclosure, the first lens L1 and the second lens L2 are, for example, two convex lenses with focal lengths of 50 mm and 200 mm, respectively. The scanning mirror 122 is located at the focal point of the first lens L1. The diffraction element 126 can be a diffraction grating with a period of 600 lines per millimeter, but the present disclosure is not limited thereto. The first lens L1 and the second lens L2 can be confocal, and the diffraction element 126 is set at another focal point position of the second lens L2 different from the co-focal point. By means of the above configuration, different wavelength portions in the laser excitation beam LL can diffract at the same position of the diffraction element 126. The spectral distribution of the laser excitation beam LL is a Gaussian distribution, but the present disclosure is not limited thereto. The diffraction element 126 can spatially disperse the laser excitation beam LL generated by the laser generator 110 for subsequent refocusing of the diffracted beams with different wavelengths to achieve higher energy. For example, after the laser excitation beam LL hits on the diffraction element 126, a long wavelength beam LR, a medium wavelength beam LG, and a short wavelength beam LB (collectively referred to as dispersed beams LSP) dispersed in space schematically shown in FIG. 2. The long wavelength beam LR can be a red beam, the medium wavelength beam LG can be a green beam, and the short wavelength beam LB can be a blue beam.

In some embodiments of the present disclosure, the laser excitation beam LL enters the wavelength adjustment module 120 and sequentially passes through the scanning mirror 122, the expander 124, and the diffraction element 126, and then leaves the wavelength adjustment module 120. At this moment in time, the laser excitation beam LL has been dispersed in space according to the wavelength portions and can continue to propagate.

Next, the laser excitation beam LL that has been dispersed in space (for example, the long wavelength beam LR, the medium wavelength beam LG, and the short wavelength beam LB) can be adjusted to be parallel to each other after passing through a collimating lens CL1, and makes the laser excitation beam LL re-focus on a back focal plane of the objective lens O1 after being dispersed in space by different wavelength portions. Then each dispersed laser excitation beam LL can be deflected by the objective lens O1 to form only one beam area on a front focal plane of the objective lens O1 that can be recombined in phase, achieving a wide-field temporal-focusing multiphoton excitation. After being recombined in phase, the pulse width can be compressed to be narrower than that of the original laser excitation beam LL generated by laser generator 110, thereby increasing the peak power of the beam. In some embodiments of the present disclosure, the aforementioned collimating lens CL1 and the objective lens O1 (for example, a water immersion objective) can form a configuration of a 4f optical system. Under the above configuration, it is possible to control the movement direction of the sample 132 on the optical axis of the objective lens O1 by means of an aligning stage 130 to excite molecular signals under test at different depths in the sample 132 and use subsequent optical components to collect the emission light signals and analyze the images.

In the embodiment illustrated in FIG. 2, the laser excitation beam LL passes through the diffraction element 126 and then sequentially passes through the collimating lens CL1 and a dichroic mirror DM before entering the objective lens O1, and the laser excitation beam LL can be focused, by the objective lens O1, on the sample 132 on the aligning stage 130. In this embodiment of the present disclosure, a reflector M2 and a reflector M3 can also be added as needed to adjust the optical path direction. Using the above method of adjusting the scanning mirror 122 allows the beams with different wavelengths to be adjusted to the same position in the optical path quickly, and it can be very convenient for observing the sample 132 stained with different types of fluorescent molecules or molecules that can generate Raman spectral signals, making the two-photon excitation fluorescence or the Raman excitation more efficient and conducive to the subsequent image analysis.

When the molecules under test in sample 132 are excited by the focused beams, an emission light EL generated by the molecules under test returns to the dichroic mirror DM through the objective lens O1. The dichroic mirror DM is used to filter out different wavelength portions of the laser excitation beam LL in the emission light EL according to the needs, and a preselected wavelength range of the emission light EL, at the same time, can be reflected for the subsequent image analysis. The preselected wavelength range of the emission light EL can be referred to as a sample beam LS in the present disclosure. It should be noted that when the laser excitation beam LL passes through the dichroic mirror DM, all wavelengths in the laser excitation beam LL will pass through the dichroic mirror DM and enter the objective lens O1. However, when the emission light EL, from the sample 132, returns to the objective lens O1 and then to the dichroic mirror DM, only the sample beam LS with the preselected wavelength range is reflected by the dichroic mirror DM and enters a filter F. The filter F is used to further filter out the wavelength signals of the laser excitation beam LL and retain the remaining wavelength signals. For example, when the wavelength signals of the laser excitation beam LL may be defined as a kind of long wavelength signal, the filter F can be a short-pass filter for filtering out the long wavelength signals, to filter out the laser excitation beam LL having the long wavelength signals.

In the prior art, optical components such as a filter wheel can usually be set up to filter out wavelength signals of the laser excitation beam. The filter wheel is a disc with different bandpass filters and rotated to select one of the bandpass filters as needed. Each filter of the filter wheel can be set to pass a selected wavelength band (such as $\Delta\lambda=50$ nm), which is much narrower than the wavelength band of the filter F mentioned above. It can be known that the precise wavelength band can be selected by rotating the corresponding filter wheel. However, when multiple wavelength bands of the emission light EL need to be captured, the filter wheel needs to be rotated to replace the corresponding filters, which will increase the time required for measurement and imaging. In contrast, the filter F disclosed herein allows the emission light EL generated by all types of molecules under test in the sample 132 to pass through, and filters out the interference caused by the laser excitation beam LL (i.e., wavelength signals generated by the laser generator 110) at the same time. The advantage of the aforementioned description is that it eliminates the need for optical components such as the filter wheel that rotates the multiple bandpass filters, greatly increasing convenience and efficiency in practice. The filter F mentioned above is still feasible even in cases where multiple wavelength bands need to be captured. It is because that the present disclosure further uses a single-pixel imaging and spectral separating module to measure the spectral signals and perform analysis. This makes it feasible to use a wide wavelength range of the spectral signals and reconstruct images at the same time, and can successfully identify the emission light EL generated by different fluorescent molecules in the sample 132 to obtain images of the sample 132 corresponding to different fluorescent molecules.

In short, the present disclosure creatively combines the single-pixel imaging and spectral separating module with the wide-field spectral imaging system having an adjustable wavelength excitation band. In some embodiments of the present disclosure, using the filter F and spectral separation improves the spectral resolution of image while keeping simple configuration of the system. This is a significant breakthrough for the spectrally-resolved microscopy imaging analysis of fluorescent molecules or molecules that can generate Raman signals. The present disclosure will provide detailed descriptions of the single-pixel imaging and spectral separating module in the following sections.

After the sample beam LS passes through the filter F, light signals in the sample beam LS can be imaged on a digital micromirror device DMD by an imaging lens IL. In some embodiments shown in FIG. 2, the direction of the optical path can also be adjusted by a reflector M4 when necessary. The sample beam LS can be modulated by a series of patterns FG on the digital micromirror device DMD. Since the digital micromirror device DMD is also a diffraction device, beams that leave the digital micromirror device DMD after modulation will be diffracted and dispersed into diffracted beams MRL with a divergent angle. The beams leaving the digital micromirror device DMD can be corrected to a collimated light as shown in FIG. 2 by a collimating lens CL2 and enter the subsequent lenses.

The digital micromirror device DMD is composed of hundreds of thousands or millions of micromirrors and can change its graphic variation, grayscale depth, and graphic projecting time through an external control. In some embodiments of the present disclosure, spacing between micromirrors is the same. These micromirrors can be controlled and quickly tilted at an angle of 12 degrees (or other fixed angles) by digital driving signals to change the reflection direction of an incident light. If an "open" state of the micromirrors is at positive 12 degrees, then a "closed" state of the micromirrors can be at negative 12 degrees. The incident light corresponding to the "open" state can be reflected and used by the subsequent optical components and finally reaches a detection element DE, while the incident light corresponding to the "closed" state is absorbed by an optical absorber or reflected away without being used. Therefore, the digital micromirror device DMD can be regarded as a two-dimensional reflection grating that reflects the spatially-modulated light along the optical axis of the subsequent optical path.

Since pixels of the detection element DE used for subsequent imaging are generally small, such as scales of 10 microns on its side. In order to avoid overlapping interference on the pixels of the detection element DE caused by the emission light from different positions in the sample after spectral separation, some embodiments use focal lenses to focus and shrink the diameter of the diffracted beam MRL and present it in form of a point light source through a pinhole while filtering out higher frequency noise in the optical field. In this embodiment of the present disclosure, the combination of a first focal lens FL1 and a pinhole PH can avoid overlapping interference on the spectrum caused by light signals from different sample positions. Then, the point light source can be collimated by a collimating lens CL3 and then passed into a prism P to perform wavelength dispersing of the original diffracted beam MRL. The dispersed beams of various wavelengths are then focused on the detection element DE through a second focal lens FL2. The diffracted beam MRL after passing through the prism P will exhibit a linear distribution in space. Therefore, in one embodiment of the present disclosure, the detection element DE can be arranged into a linear array. Specifically, the detection element DE can be a charge-coupled device (CCD) or a complementary metal-oxide-semiconductor (CMOS), which can collect light signals of various spectra for the subsequent reconstruction of spectral images in different wavelength bands to obtain the spectrally-resolved images of different molecules under test in the sample 132. Accordingly, the disclosure of the present disclosure has multiple advantages such as high spatial resolution, high spectral resolution, and high measurement efficiency compared with the prior art.

Although the prism P mentioned above can also be replaced by the grating to obtain more dispersed distribution of diffraction light and may improve spectral resolution. However, in some embodiments shown in FIG. 2, the prism P provides better optical efficiency and overall imaging quality.

The term "single-pixel imaging" used herein is described as follow. The use of the digital micromirror device DMD can be regarded as an application of the single-pixel imaging. The single-pixel imaging uses a series of orthogonal patterns with different spatial frequencies (the embodiment shown in FIG. 2 illustrated that the orthogonal patterns are made by the digital micromirror device DMD) to modulate the sample beam LS emitted by the sample 132. By using the difference of frequencies between the patterns, the sample beam LS with a spatial frequency that changes over time is modulated. Next, using a spectral separating module and the detection element DE as a camera detector collects light intensity of different spatial frequencies, and then using a deep learning trained model via a reconstruction inversion algorithm calculates the data of the sampled light intensity to obtain a reconstructed image. The calculation concept of imaging is calculating the inner product of the sample beam LS of the sample 132 and the orthogonal patterns to obtain an intensity coefficient, and the formula is shown as follows:

$$\text{Intensity } i = [\text{image}(m, n)] \cdot [\text{orthogonal pattern } i(m, n)]$$

Figure 3:
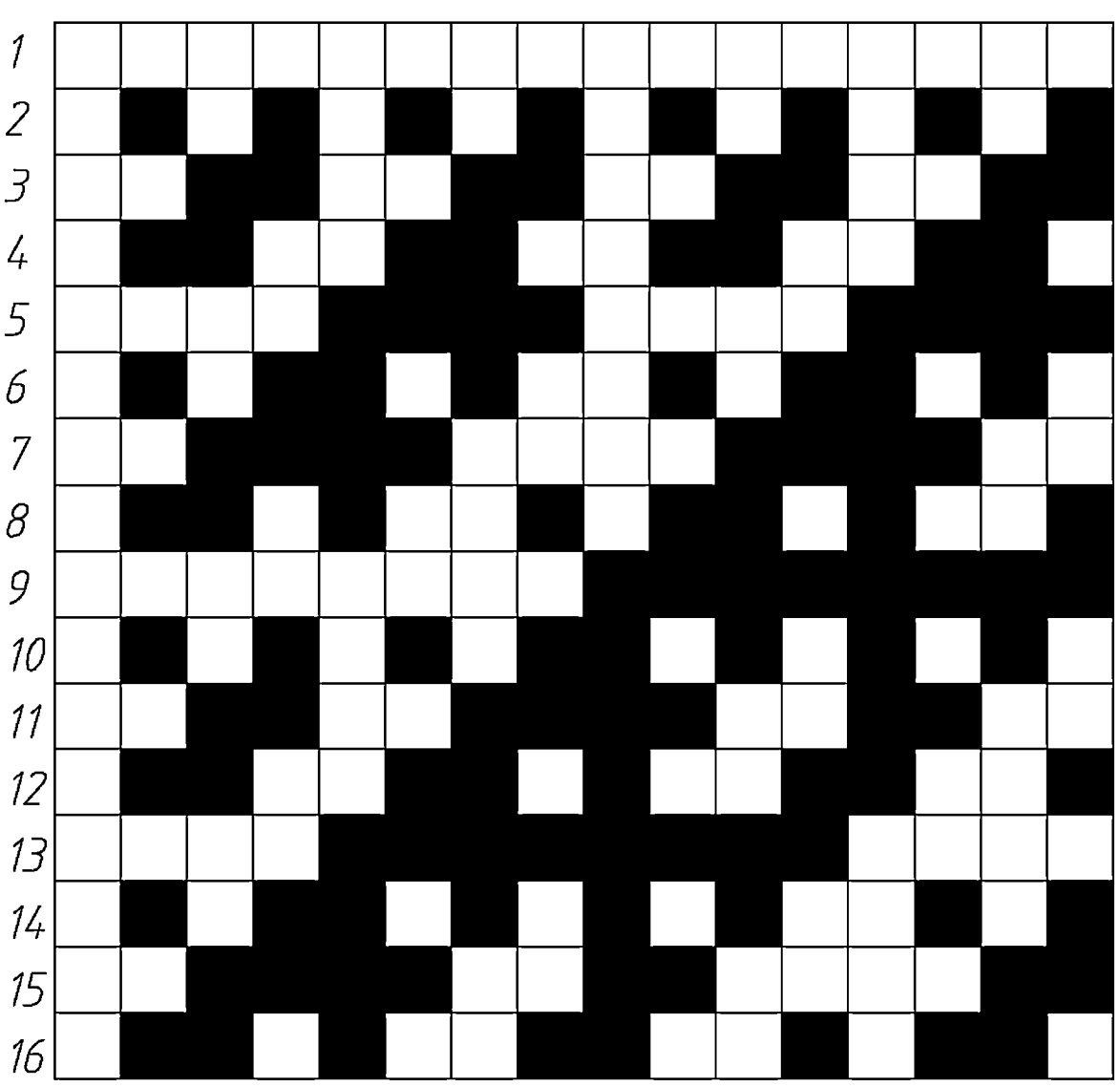
FIG. 3 is an example illustrating a Hadamard patterns according to some embodiments of the present disclosure.

The (m, n) is a spatial coordinate, the Intensity$_i$ is the component of the signal (light) intensity corresponding to the spatial coordinate, and i is the number of the modulation patterns. The orthogonal patterns are usually Hadamard patterns, which have black and white binary features and are suitable for the high-speed digital micromirror device DMD. Therefore, compared with orthogonal Fourier patterns, they are less likely to make errors during quantization and thus improve the quality of the image. FIG. 3 illustrates an example of the Hadamard patterns in some embodiments of the present disclosure, which is a 16-order Hadamard matrix. Of course, the application and order of the Hadamard matrix are not limited to the example shown in FIG. 3, and the order of the Hadamard matrix depends on the number of pixels of the image.

By using the single-pixel imaging technique described above, all signals on the entire cross-section of the optical path are focused on the detection element DE via lenses, instead of using the conventional imaging system with an imaging lens and a camera for imaging the signals separately. Therefore, there is no aberration problem shown in the conventional imaging systems. In addition, for the light in biological tissues with lower transparency, the single-pixel imaging technique can focus all signals on the detector at the same time and analyze the signals separately, thus reducing the scattering problem of the signals during imaging.

Combining the embodiments shown in FIG. 1 and FIG. 2, the single-pixel imaging and spectral separating module 140 may comprise the digital micromirror device DMD, the first focal lens FL1, the pinhole PH, the prism P, the collimating lens CL3, the second focal lens FL2, and the detection element DE for collecting light signals.

Figure 4:
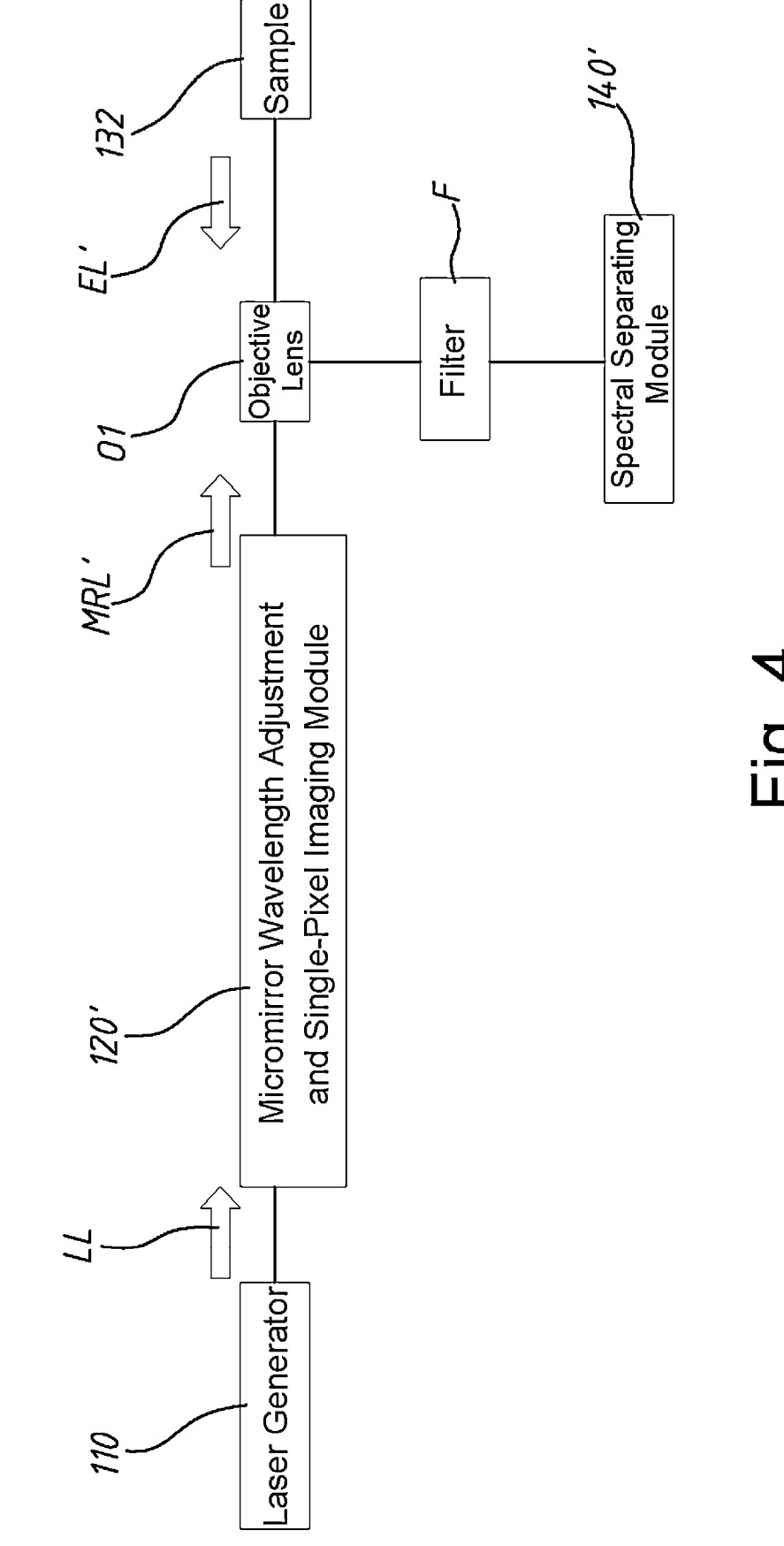
FIG. 4 is a block diagram illustrating optical components of a wide-field spectral imaging system according to some embodiments of the present disclosure.

FIG. 4 illustrates a block diagram of the optical components of a wide-field spectral imaging system 100' in some embodiments of the present disclosure. A micromirror wavelength adjustment and single-pixel imaging module 120' spatially disperses the different wavelength portions of the laser excitation beam LL (the distribution of the wavelength portions can be as Gaussian distribution) generated by a laser generator 110. These beams are focused on a sample 132 by an objective lens O1 to excite molecules under test in the sample 132 and generate an emission light EL'. The molecules under test in the sample 132 are different types of fluorescent molecules that are pre-stained in the sample 132 or molecules that can generate Raman spectral signals in the sample 132. The micromirror wavelength adjustment module and single-pixel imaging module 120' can adjust the reflection directions of beams with different wavelengths according to the wavelength of the laser excitation beam LL to maintain each beam having target wavelength dispersed by the micromirror wavelength adjustment and single-pixel imaging module 120' at the same position of the optical path. This approach can achieve the high-efficacy excitation of different types of molecules under test in the same sample 132. The micromirror wavelength adjustment and single-pixel imaging module 120' is further used to generate a series of patterns FG and modulate the laser excitation beam LL with the patterns FG, and the laser excitation beam LL with the patterns FG is dispersed into multiple groups of diffracted beams MRL'. The diffracted beam of a specific order is related to the spatial dispersion of the wavelength of the laser excitation beam and is used as a beam to excite the sample. By using the micromirror wavelength adjustment and single-pixel imaging module 120' of the wide-field spectral imaging system 100', the emission light (signal) of different types of molecules under test in the sample 132 can be successfully obtained and performed for the subsequent image reconstruction.

Next, the emission light EL' passes through the objective lens O1 along the original optical path and passes through the filter F to further filter out the wavelength signal of the laser excitation beam in the emission light EL' and retain specific wavelength signal into a spectral separating module 140'. The spectral separating module 140' is used to collect light signals that have been spectrally dispersed and perform a spectral image reconstruction.

Figure 5:
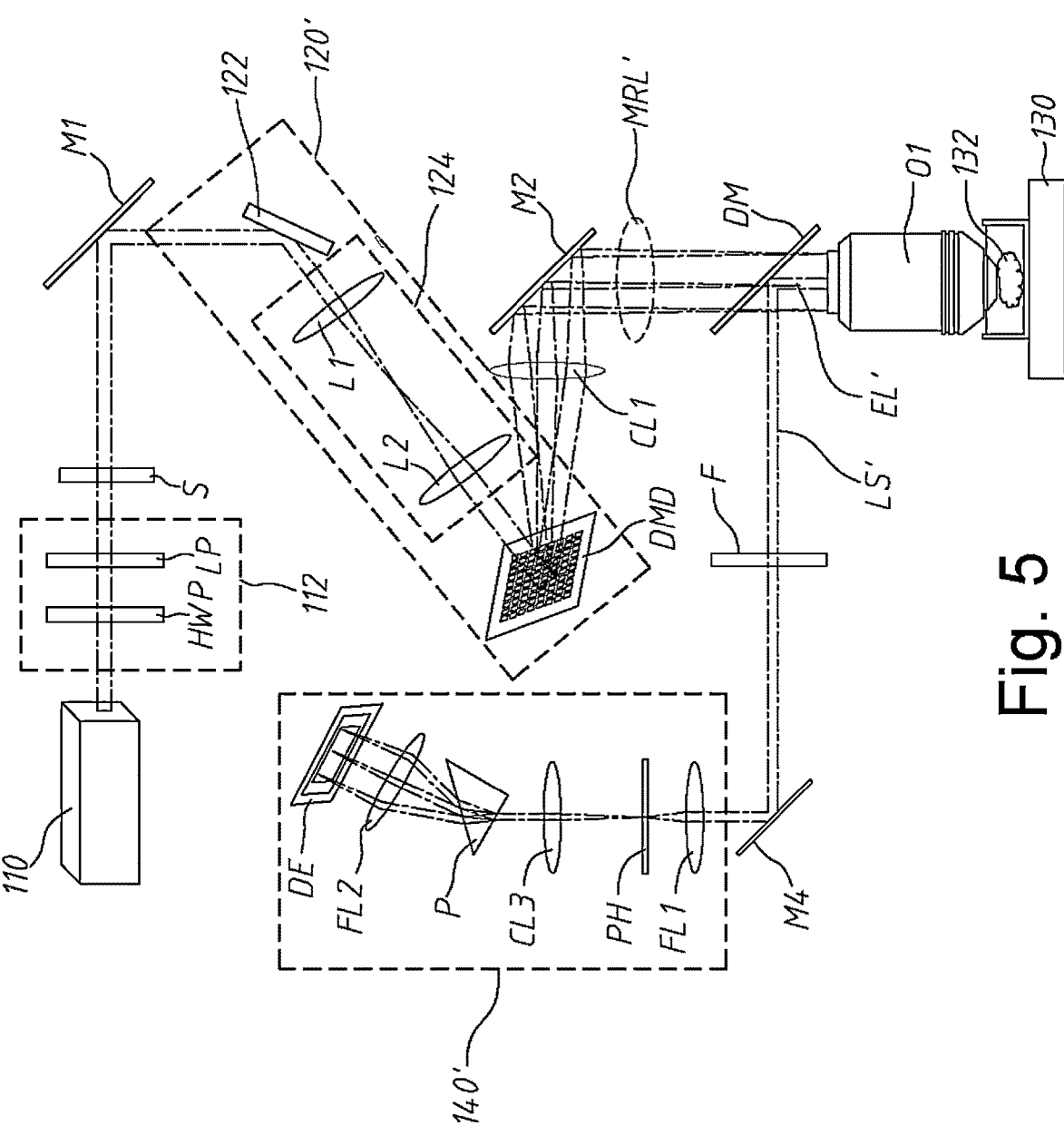
FIG. 5 is a schematic diagram illustrating an optical path of a wide-field spectral imaging system according to some embodiments of the present disclosure.

FIG. 5 illustrates a schematic diagram of the optical path of a wide-field spectral imaging system 100B in some embodiments of the present disclosure. The system 100B shown in FIG. 5 omits the diffraction element 126 of the system 100A shown in FIG. 2, and moves the digital micromirror device DMD to the position where the diffraction element 126 is originally positioned at along the optical path. The rest of the components of the system 100B are substantially unchanged compared to that of the system 100A. The following briefly describes the embodiment of the present disclosure shown in FIG. 5, wherein the principles and components that are repeated with the embodiment of the present disclosure shown in FIG. 2 will be briefly described or omitted.

The laser excitation beam LL generated by laser generator 110 passes through the light intensity adjustment element 112 and the shutter S in sequence. The light intensity adjustment element 112 can be a combination of a half-wave plate HWP and a linear polarizer LP, but the present disclosure is not limited thereto. Then, the reflector M1 can be added as needed to adjust the direction of the optical path, allowing the laser excitation beam LL to enter the micromirror wavelength adjustment and single-pixel imaging module 120' after passing through the reflector M. The micromirror wavelength adjustment and single-pixel imaging module 120' may comprise the scanning mirror 122, the expander 124, and the digital micromirror device DMD. In some embodiments of the present disclosure, the laser excitation beam LL passes through the scanning mirror 122, the expander 124, and the digital micromirror device DMD in sequence. The expander 124 may comprise the first lens L1 and the second lens L2. The micromirror wavelength adjustment and single-pixel imaging module 120' not only can spatially disperse different wavelength portions in the laser excitation beam LL by diffraction, but also performs the function of the digital micromirror device DMD described in the previous paragraph related to the embodiment shown in FIG. 2. That is, the micromirror wavelength adjustment and single-pixel imaging module 120' not only has the ability of the diffraction element for spatially dispersing the different wavelength portions of the laser excitation beam LL, but can also generate a series of patterns FG to modulate the laser excitation beam LL with the series of patterns FG for generating excitation light having the series of patterns to the sample.

After passing through the digital micromirror device DMD, the laser excitation beam LL generates a specific-order of a diffracted beam MRL'. The specific-order of the diffracted beam MRL' passes through the collimating lens CL1 and the dichroic mirror DM in sequence, enters the objective lens O1, and focuses on the sample 132 on an alignment stage 130. The collimating lens CL1 can be set between the micromirror wavelength adjustment and single-pixel imaging module 120' and objective lens O1 for collimating the beams. And, each dispersed wavelength component of the laser excitation beam LL can be focused on a back focal plane of the objective lens O1. Compared with the embodiment of the present disclosure shown in FIG. 2, this embodiment of the present disclosure omits the reflector M3. Beams with different wavelength can be quickly adjusted to the same position on the optical path by using the micromirror wavelength adjustment and single-pixel imaging module 120'. Before the beam enters objective lens O1, diffraction of different wavelength components of the laser excitation beam LL and modulation of the series of patterns FG required for single-pixel imaging can be completed at the same time. Compared with the modulation of emission light of the sample in the previous embodiment of the present disclosure, the prior modulation of excitation light can use the limited signal generated by the molecules under test on the sample more efficiently for capturing sample signal by the single-pixel imaging, which is beneficial for subsequent image analysis.

When the molecules under test in the sample 132 is excited by the focused beam, the generated emission light EL' returns to the dichroic mirror DM through the objective lens O1. The dichroic mirror DM is used to preliminarily filter the wavelength signal of the laser excitation beam LL in the emission light EL and the preselected wavelength range in the emission light EL is reflected as the sample beam LS' for subsequent analysis. It should be noted that when the laser excitation beam LL passes through the dichroic mirror DM, all wavelengths processed by the digital micromirror device DMD in the laser excitation beam LL pass through the dichroic mirror DM and enter the objective lens O1. However, when the emission light EL' of the sample 132 returns to the objective lens O1 and then to dichroic mirror DM, only the pre-selected wavelength portions of the sample beam LS' are reflected by the dichroic mirror DM and enters the filter F. The function of the filter F in this disclosure of the present disclosure and its impact on the beam have been described in detail in the embodiment of the present disclosure of FIG. 2 and will not be repeated here.

After passing through the filter F, the sample beam LS' with preselected wavelength range enters the first focal lens FL1. The direction of the sample beam LS' can be adjusted according to the actual needs by setting the reflector M4. The first focal lens FL1 can be used to focus the sample beam LS' and reduce the diameter of the sample beam LS'.

Then, by using the collimating lens CL3 to collimate the point source light, the sample beam LS' enters the prism P and the spectral separation of sample beam LS' is performed. Each wavelength of the dispersed beams is then focused on the detection element DE by the second focal lens FL2. The detection element DE collects optical signals of various wavelengths for subsequent reconstruction of spectral images in different wavelength bands. The different molecules under test in the sample 132 can be measured to obtain spectral analysis images of the sample 132. Compared with existing technologies, it has multiple advantages such as high spatial resolution, high spectral resolution, and high measurement efficiency.

In the embodiment of the present disclosure shown in FIG. 5, the first focal lens FL1, the pinhole PH, the collimating lens CL3, the prism P, the second focal lens FL2, and the detection element DE can be regarded as components of the spectral separating module 140'.

Figure 6:
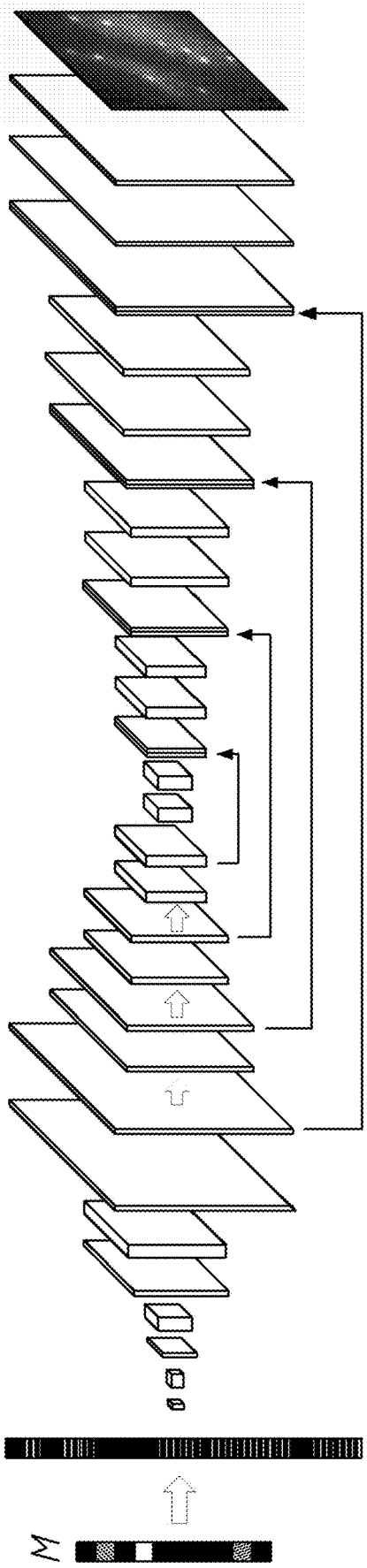
FIG. 6 is a schematic diagram illustrating a deep learning training model according to some embodiments of the present disclosure.

Referring to FIG. 6, a deep learning model developed by inventors for image reconstruction in the various wavelength bands will be described herein. FIG. 6 illustrates a schematic diagram of the deep learning model in some embodiments of the present disclosure. The deep learning model is based on U-Net model after tuning some parameters for image reconstruction. After performing a series of pattern FG modulation and spectral separation of the sample beam, the light signal is recorded by a single sensing unit of the detection element in this system of the present disclosure. Thus, the signal is the (light) signal intensity for single wavelength band and single modulation pattern FG. Then, each (light) signal intensity of its sample beam after each modulation pattern FG are sequentially recorded to form a series of signal intensities for a single wavelength band, which is arranged in a data format of M×1 array. Similarly, the optical intensities recorded by the adjacent sensing units are summed up as a signal for specific wavelength band. After modulating the sample beam with a series of modulation patterns FG, the optical intensities of the sample beams within a specific wavelength band for a series of pattern FG modulation can be also recorded to form a corresponding M×1 array data. The input of the deep learning model is this M×1 array data, which is then calculated by convolutional and connection layers in the deep learning model for subsequent image reconstruction of the U-Net model. The U-Net model is divided into two parts: an encoding layer and a decoding layer. The encoding layer operates with multiple down-sampling operations to extract features from the training images. With each down-sampling operation, image size decreases by half while number of extracted features doubles. The decoding layer is multiple up-sampling operations and used to reconstruct images from the features extracted from the encoding layer. With each up-sampling operation, image size doubles while number of features decreases by half. Decoding layer further comprises a concatenation layer, which concatenates shallow features with deep features to prevent losing the deep features during reconstruction process for better reconstruction quality. Using these algorithms reduces the number of the patterns FG used and can also perform reconstruction at a lower intensity level of sample signals, which can help improve temporal resolution or reduce power required for the emission light.

Figure 7:
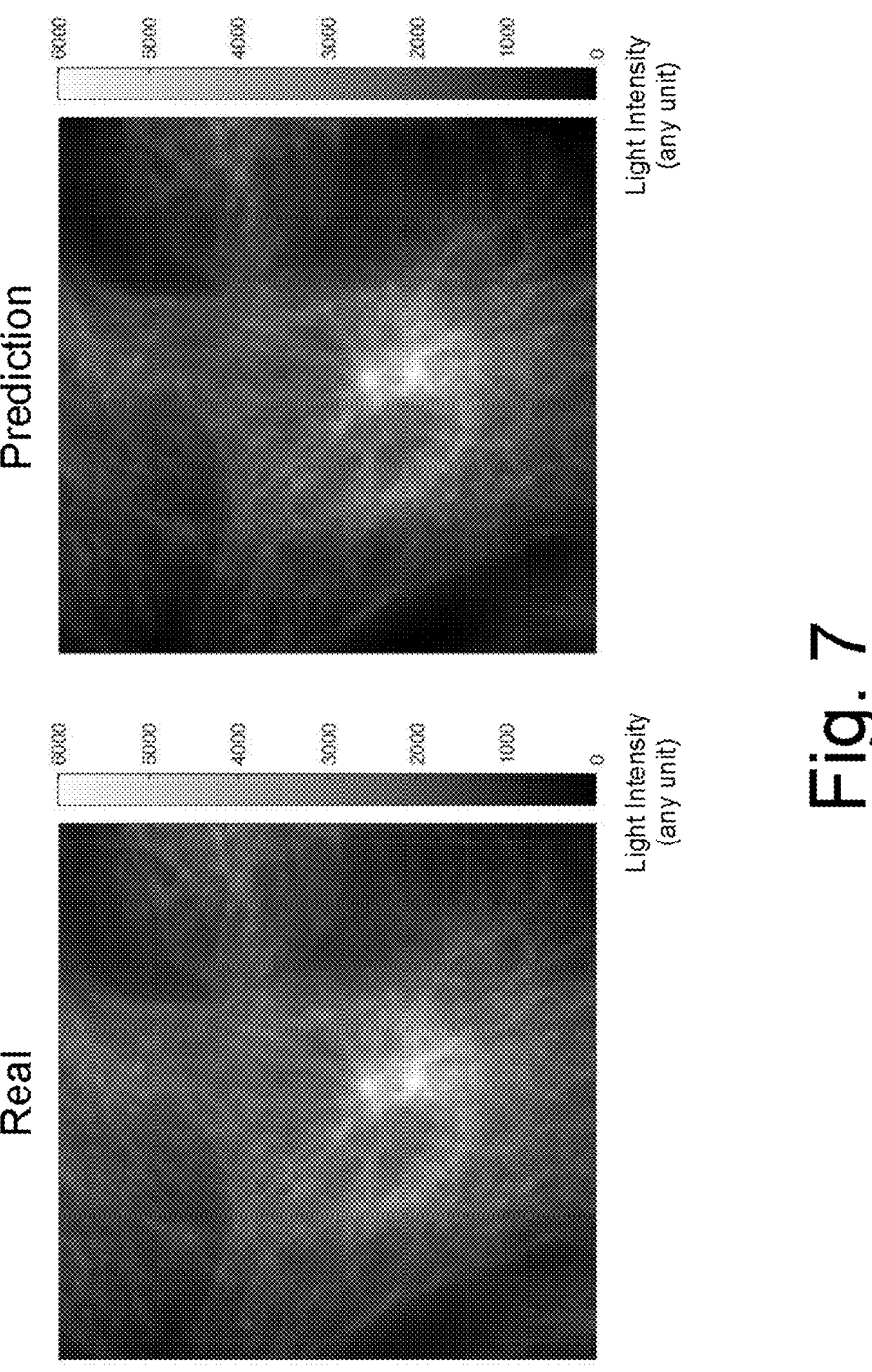
FIG. 7 is a performance comparison graph illustrating a single-pixel image reconstruction using a deep learning model according to some embodiments of the present disclosure.

FIG. 7 shows a performance comparison of the effectiveness of deep learning model of the U-Net for wide-field spectral image reconstruction in some embodiments of this disclosure. The left panel of FIG. 7 is a real image of microtubules having cells stained with fluorescent dye; and the right panel of FIG. 7 is a prediction result of U-Net model by the M×1 array data of single-pixel imaging for a specific wavelength band. The comparison in FIG. 7 shows that the reconstruction result has a high degree of similarity with the real image, which reaches the accuracy required by the invention concept and embodiments disclosed herein. This result also verifies that the aforementioned deep learning training can achieve and improve the quality of reconstructed images and the reconstructed result is similar to the real image even using fewer reconstructed image patterns.

Figure 8A:
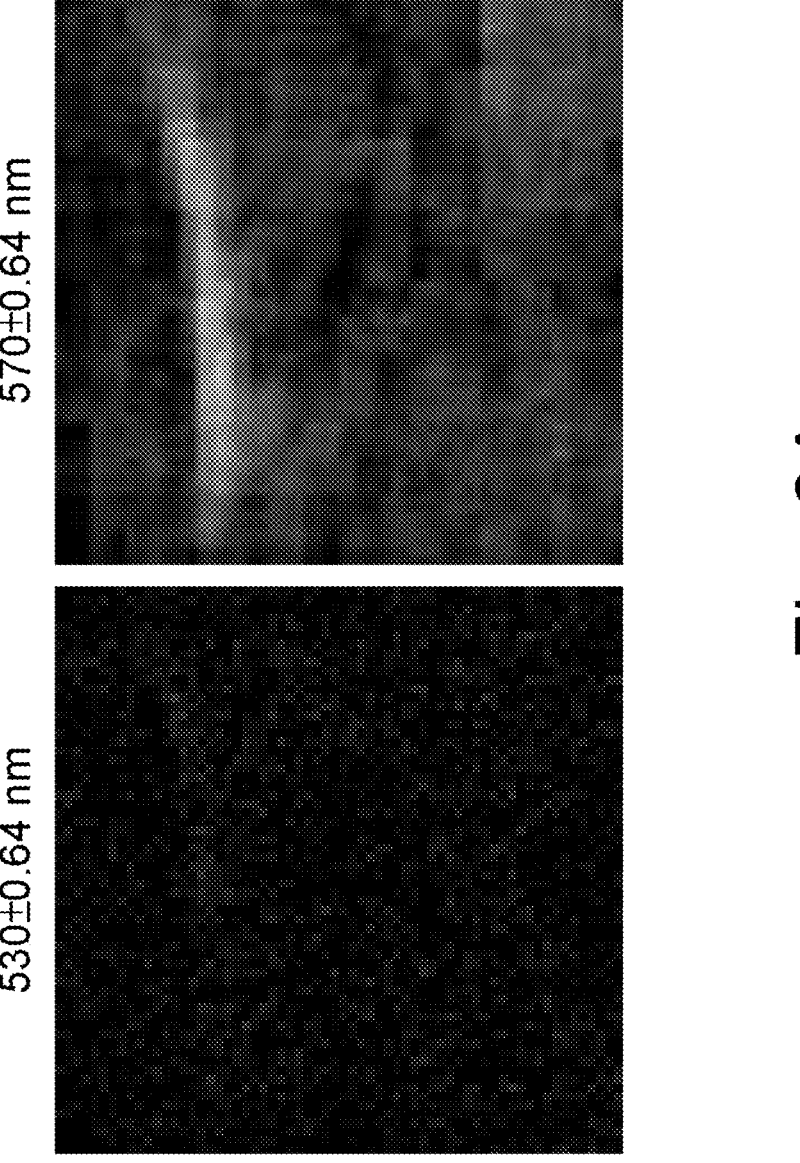
FIG. 8A illustrates the results of reconstructed spectral images according to some embodiments of the present disclosure.
Figure 8B:
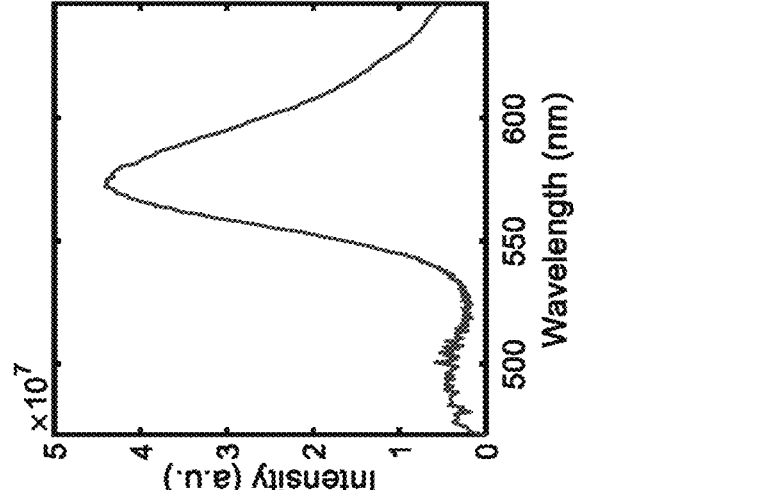
FIG. 8B illustrates the results of spectral analysis according to some embodiments of the present disclosure.

FIG. 8A illustrates the results of spectral reconstructed images in some embodiments of the present disclosure, and FIG. 8B illustrates the fluorescence spectra obtained from the spectral reconstruction image analysis. In some embodiments of the present disclosure, image reconstruction for each band is performed first. FIG. 8A shows images of the actin filaments of the cell stained with the fluorescent dye Tetramethylrhodamine (TRITC) reconstructed for wavelengths 530±0.64 nm (referring to the left panel of FIG. 8A) and 570±0.64 nm (referring to the right panel of FIG. 8A), respectively. Then, image intensity summation is performed for the reconstructed image of each wavelength band and finally rendered into a fluorescence spectrum as shown in FIG. 8B. Moreover, the spectral data of each specific region in reconstructed image can also be obtained by summing up the image intensities of each wavelength-band reconstructed image in the specific region. The descriptions of FIGS. 6 to 8B are examples of image processing and deep learning image reconstruction methods, which can be applied to wide-field spectral imaging systems 100, 100A, 100' and 100B disclosed herein and are not intended to limit the methods of data processing disclosed herein.

In summary, the embodiments disclosed herein creatively combine the wide-field excitation imaging system having adjustable wavelength excitation with the single-pixel imaging and spectral separating module, greatly increasing spectral resolution of samples stained with different fluorescent molecules. In addition, the adjustable wavelength excitation also enhances the excitation efficiency of different molecules under test. Thus, the various features and microenvironmental spectral variations of samples stained with different fluorescent molecules can be clearly sampled and presented in the analyzed images, which is a great help to the research and development of biomedical subjects.

Although the disclosure of the present disclosure has been disclosed according to the aforementioned embodiments, it is not intended to limit the disclosure of the present disclosure.

Those skilled in the art will readily observe that numerous modifications and alterations of the device and system may be made while retaining the teachings of the invention. Accordingly, the above disclosure should be construed as limited only by the metes and bounds of the appended claims.

What is claimed is:

1. A wide-field spectral imaging system, comprising:
a laser generator for generating a laser excitation beam;
a micromirror wavelength adjustment and single-pixel imaging module, configured to:
disperse the laser excitation beam into multiple beams of different wavelengths,
generate a series of patterns, and
modulate the laser excitation beam with the series of patterns to generate multiple sets of diffracted beams;
an objective lens configured to focus the sets of diffracted beams on a sample to excite the molecules under test in the sample via a wide-field temporal-focusing multiphoton excitation and to generate an emission light; and
a spectral separating module for collecting the emission light and performing wide-field spectral image reconstruction.

2. The wide-field spectral imaging system according to claim 1, further comprising a filter, disposed between the objective lens and the spectral separating module, for filtering out a wavelength signal of the laser excitation beam in the emission light.

3. The wide-field spectral imaging system according to claim 1, further comprising a dichroic mirror for reflecting a portion of the emission light having a preselected wavelength range to form a sample beam.

4. The wide-field spectral imaging system according to claim 1, wherein the spectral separating module comprises:
a collimating lens for adjusting the sets of diffracted beams to be parallel to each other;
a first focal lens for focusing and reducing the diameter of the sample beam; and
a prism for performing wavelength dispersion on the sample beam passing through the first focal lens, for subsequent light signal collection and the wide-field spectral image reconstruction.

5. The wide-field spectral imaging system according to claim 1, wherein the micromirror wavelength adjustment and single-pixel imaging module comprises:
a scanning mirror for fine-tuning the output direction of the laser excitation beam passing through the scanning mirror; and
a digital micromirror device for generating the series of patterns, and modulating the laser excitation beam with the series of patterns to generate the sets of diffracted beams, and for separating different wavelength portions of the laser excitation beam passing through the scanning mirror.

6. The wide-field spectral imaging system according to claim 5, wherein the micromirror wavelength adjustment and single-pixel imaging module further comprises an expander for enlarging the cross-sectional area of the laser excitation beam, and the expander comprises a first lens and a second lens; and wherein the laser excitation beam passes through the scanning mirror, the first lens, the second lens, and the digital micromirror device in sequence.

7. The wide-field spectral imaging system according to claim 1, wherein the spectral separating module comprises:
a second focal lens for focusing the diffracted beams that have been dispersed by the prism; and
a detection element for collecting the focused diffracted beams passing through the second focal lens, for subsequent the wide-field spectral image reconstruction of different wavelength bands.

8. The wide-field spectral imaging system according to claim 1, further comprising:
a light intensity adjustment element, disposed between the laser generator and the micromirror wavelength adjustment and single-pixel imaging module, for controlling the power of the laser excitation beam in the subsequent optical path.

* * * * *